(12) United States Patent
McDonald et al.

(10) Patent No.: US 9,373,079 B2
(45) Date of Patent: Jun. 21, 2016

(54) ARGUMENT AND DECISION OPTIMIZING ENGINE

(71) Applicants: Alex McDonald, Houston, TX (US);
Lee Weinstein, Arlington, MA (US)

(72) Inventors: Alex McDonald, Houston, TX (US);
Lee Weinstein, Arlington, MA (US)

(*) Notice: Subject to any disclaimer, the term of this patent is extended or adjusted under 35 U.S.C. 154(b) by 219 days.

(21) Appl. No.: 14/047,070

(22) Filed: Oct. 7, 2013

(65) Prior Publication Data
US 2015/0100520 A1    Apr. 9, 2015

(51) Int. Cl.
*G06F 17/00* (2006.01)
*G06N 5/02* (2006.01)
*G06F 3/0484* (2013.01)
*G06Q 50/00* (2012.01)

(52) U.S. Cl.
CPC .............. *G06N 5/02* (2013.01); *G06F 3/04847* (2013.01); *G06Q 50/01* (2013.01)

(58) Field of Classification Search
CPC .................................. G06N 5/02; G06F 3/48
See application file for complete search history.

(56) References Cited

U.S. PATENT DOCUMENTS 8,660,972 B1 *   2/2014   Heidenreich et al. ........... 706/45
8,676,735 B1 *   3/2014   Heidenreich et al. ........... 706/45

OTHER PUBLICATIONS

Lai, Vincent S. et al.; "Group decision making in a multiple criteria environment: A case using the AHP in software selection"; 2002; Elsevier Science B.V.; European Journal of Operational Research 137; pp. 134-144.*

* cited by examiner

*Primary Examiner* — Li-Wu Chang
(74) *Attorney, Agent, or Firm* — Lee Weinstein

(57) ABSTRACT

A system is described for improving decision making for individuals, groups and organizations. The system enables participants to collaboratively provide informational statements as well as supporting and opposing arguments and share them and then rate them. The system visually facilitates participants prioritizing arguments, and allows participants to rate arguments on clarity, agreement, and relevance. The system includes multiple levels of authority, both inherent and topic-assignable, which enable posts to be made visible/invisible based on authority level and/or "need to know". The system allows decision makers to increase the reach of participants in decisions while keeping the input and process manageable yielding better decisions. All posts, ratings, and edits of posts and ratings within the system are archived along with any reasons given, and archives are reviewable by users.

33 Claims, 20 Drawing Sheets
(20 of 20 Drawing Sheet(s) Filed in Color)

Fig 1

| Elucidate | Home | Help | Admin | Logout | Full | Summary | Summary with Subs | Context | Position Statements |

GLOBAL WARMING IS REAL, IS A THREAT TO HUMAN LIFE, AND WORLD POLITICAL AND ECONOMIC STABILITY. IT ONLY MAKES SENSE FOR US TO TRY TO MINIMIZE IT.

NAVIGATE TO LEVEL: 1

| My Rating | Description | | |
|---|---|---|---|
| 9 | + | Over 97% of 1,372 climate researchers accept human carbon emissions as a major factor causing global warming<br>The large majority of scientists who have studied this question, in every country, accept the reality of anthromorphic global warming. Naysayers claim it is a matter of dispute, but it really isn't as far as scientific questions go. A 2010 study of work by 1,372 climate researchers concluded 97-98% accept Anthropogenic Climate Change as outlined by the Intergovernmental Panel on Climate Change. | Edit Src X |
| 7 | − | Solar radiation during quiet sunspot activity has increased<br>"Since the late 1970s, the amount of solar radiation the sun emits, during times of quiet sunspot activity, has increased by nearly .05 percent per decade, according to a NASA funded study." One scientist said "if sustained over many decades, it could cause significant climate change." | Edit Src X |
| 7 | + | More than 32 national Academies of Science and other premier scientific organizations have called to reduce greenhouse gas emissions<br>The most prestigious scientific organizations in the world (UN's Intergovernmental Panel on Climate Change (IPCC), 32 national Academies of Science in a joint statement, the American Association for the Advancement of Science, Britain's Royal Society) have called for action to reduce greenhouse gas emissions. The IPCC stated in 2007 that "[most] of the observed increase in global average temperatures since the mid-20th century is very likely due to the observed increase in [human greenhouse gas] concentrations." | Edit Src X |
| 6 | − | Slowing greenhouse gas emissions is too expensive<br>The costs to slow greenhouse gas emissions to the levels specified in the Kyoto treaty are 3% of world product, or $900 billion per year. This is too [much and] could better be spent alleviating poverty, cleaning up toxic waste, and providing basic medical care to poor people. | Edit X |
| 6 | | [carbon diox]ide levels has risky and unknown consequences<br>[Due to g]lobal warming, the increased carbon dioxide levels are contributing to a decline in the pH of the oceans. This is changing the ocean's biosphere. We don't know what this will result in for humanity. | Edit X |

→ 200

Agreement Reason: High levels of carbon dioxide is dangerous/less healthy. We don't know everything. ← 201

Fig 2

Elucirate    Home    Help    Admin    Logout

Prospective Client Industries under account Consulting

The title of the topic

[Prospective Client Industries]

☑ Open for ratings  [Tree] [Ratings]

☑ Require rating reasons  [Tree]

☑ Open for adding / editing position statements  [Tree]

☐ Hide from users  [Tree]

[Save]  Cancel

Fig 8

Elucidate  Home  Help  Admin  Logout

The US should take military action within the next 10 months to prevent Iran from getting a nuclear weapon.

← Back to history list

Edit comment:

Rewording:: Time is running out so 12 mths is too long. Needed more details in description. It is a topic so should be neutral rather than supporting or opposing.

| Field | Content |
|---|---|
| Title | The US should take military action within the next 1~~2~~0 months to prevent Iran from getting a nuclear weapon. |
| Description | Although we do not want to get into another conflict in the Middle East, the risks of a nuclear-armed Iran are too great. We must stop the Iranians from getting a nuclear weapon and move quickly and decisively. |
| Parent | ~~United States Politics~~<br>+ Middle East Policies |
| Last Updated On | ~~March 30, 2013, 11:04 p.m.~~ (time since that date: 3 months)<br>+ May 29, 2013, 5:20 p.m. (time since that date: 1 month) |

Fig 9

Elucirate

Home   Help   Admin   Logout

History for The US should take military action within the next 10 months to prevent Iran from getting a nuclear weapon.

[Compare]

| | Date | User | Comment |
|---|---|---|---|
| ○ | May 29, 2013, 8:41 p.m. | AlexClientAdmin | Typo:: Removed a dot |
| ○○ | May 29, 2013, 5:20 p.m. | AlexClientAdmin | Rewording:: Time is running out so 12 mths is too long. Needed more details in description.. It is a topic so should be neutral rather than supporting or opposing. |
| ○ | May 23, 2013, 12:29 a.m. | | Initial version. |

Fig 10

| My Rating | Description | | |
|---|---|---|---|
| NR | Potentially devastating consequences require preemptive intervention | Edit | ⊙ ✕ |
| NR | △ Niran having nuclear weapons is not a US concern. | Edit | ⊙ ✕ |
| NR | Cyberwarfare should be used instead. | Edit | ⊙ ✕ |
| NR | If Iran gets a bomb, it isn't so bad. | Edit | ⊙ ✕ |
| NR | Iranian use of bomb would upset US national security interests. | Edit | ⊙ ✕ |
| NR | △ Iranian bomb would upset regional power balance. | Edit | ⊙ ✕ |
| NR | Any use of atomic bombs against people sets a bad precedent. | Edit | ⊙ ✕ |
| NR | Might not work and failure would produce complications. | Edit | ⊙ ✕ |
| NR | △ Iran's leadership is dangerous and aggressive. | Edit | ⊙ ✕ |

Elucirate — Home Help Admin Logout | Full Summary Summary with Subs | Context Position Statements

THE US SHOULD TAKE MILITARY ACTION WITHIN THE NEXT 10 MONTHS TO PREVENT IRAN FROM GETTING A NUCLEAR WEAPON.

Although we do not want to get into another conflict in the Middle East, the risks of a nuclear-armed Iran are too great. We must stop the Iranians from getting a nuclear weapon and move quickly and decisively.

NAVIGATE TO LEVEL: 1

Fig 11

History for Potentially devastating consequences require preemptive intervention

[Elucidate | Home | Help | Admin | Logout]

Compare

| | Date | Rating: Agreement | Reason: Agreement |
|---|---|---|---|
| ● | June 19, 2013, 8:28 a.m. | 3 | One is never sure how something is going to turn out and one can actually create more of a mess than would have occurred otherwise. |
| ○○ | May 29, 2013, 5:36 p.m. | 4 | One is never sure how something is going to turn out and one can actually create more of a mess than would have occurred otherwise. |
| ● | May 23, 2013, 12:29 a.m. | 7 | It is better to act than to let something bad happen. |

Fig 12

| Elucirate | Home | Help | Admin | Logout |

Prospective Client Industries under account Consulting

Ratings Configuration: Agreement

| Rating Value | Rating Description | | |
|---|---|---|---|
| 0 | Totally Disagree / Unimportant | Edit | X |
| 1 | | Edit | X |
| 2 | Stronly Disagree / Not at all important | Edit | X |
| 3 | Disagree / Not important | Edit | X |
| 4 | | Edit | X |
| 5 | Indifferent | Edit | X |
| 6 | | Edit | X |
| 7 | Agree / Important | Edit | X |
| 8 | Strongly Agree / Very Important | Edit | X |
| 9 | | Edit | X |
| 10 | Totally Agree / Extremely Important | Edit | X |

Add a value

Save   Cancel

| Elucirate | Home | Help | Account | Logout | Full | Summary | Summary with Subs |

GLOBAL WARMING IS REAL, IS A THREAT TO HUMAN LIFE, AND WOULD POLITICAL AND ECONOMIC STABILITY. IT ONLY MAKES SENSE FOR US TO TRY TO MINIMIZE IT.

NAVIGATE TO LEVEL: 1

| My Rating | Description | | |
|---|---|---|---|
| 9 | Over 97% of 1,372 climate researchers accept human carbon emissions as a major factor causing global warming | Edit Src | X |
| 7 | Solar radiation during quiet sunspot activity has increased | Edit Src | X |
| 7 | More than 32 national Academies of Science and other premier scientific organizations have called to reduce greenhouse gas emissions | Edit Src | X |
| 6 | Slowing greenhouse gas emissions is too expensive | Edit | X |
| 6 | Higher carbon dioxide levels has risky and unknown consequences | Edit | X |
| 6 | Greenhouse gases are also from non man-made sources | Edit | X |
| 5 | Reducing production of carbon dioxide will have other benefits | Edit | X |
| 5 | Acting now only costs 1% of GDP; postponing would cost 5% of GDP | Edit Src | X |

102 — (arrow pointing to Summary button)
106 — (arrow pointing to first row)
108 — (arrow pointing to second row)

Fig 19

ARGUMENT AND DECISION OPTIMIZING ENGINE

FIELD OF THE INVENTION

The field of the invention relates to software-assisted decision making, public debate, structured arguments, and more specifically to multi-user software for engaging in debate and evaluation of assertions.

BACKGROUND OF THE INVENTION

Individuals, groups and organizations make decisions on a daily basis. Good decisions require an evaluation of pros and cons supporting and opposing a decision. The implementation of decisions is typically more successful when parties responsible for implementation are involved in the decision-making process early and can raise pros and cons as well. Unfortunately, it can be difficult to coordinate groups of people, truly understand their positions on issues and come to an optimal decision.

There are many tools which can provide information for decision making, such as search engines and wikis, and there are many tools for getting feedback, such as surveys or blogs, and there are even decision making analysis tools which help with a number of these issues. However, human beings do not always make decisions based on logic and these tools often do not help identify and distinguish emotional from logical reasoning.

There is a need for technologies which assist individuals to better understand their own positions on issues, and technologies that help them better explain those positions to others. There is also a need for innovative tools that help group or organization decision makers to better understand their constituents' preferences and reasons for those preferences.

Within any debate or topic analysis, people may attempt to bias decision-making by hiding information, presenting information in a biased way, etc. There is a need for innovative technologies which allow participants to have more confidence in decision-making processes by structuring how arguments are presented and vetted, and by openly showing changes which occur over time to neutral, supporting, and opposing arguments. All overarching assertions are considered by definition to be neutral arguments, because they are not sub-assertions below other assertions. Another example of a neutral argument would be a restatement of an overarching assertion or sub-assertion, placed as a sub-assertion below the assertion it is restating. Such a restatement might be done, for instance, to suggest a more clear way of stating the assertion.

SUMMARY OF THE INVENTION

It is an object of the present invention to provide a technology which assists individuals to better understand their own positions, explain them to others, and for group or organization decision makers to better understand participants' preferences and reasons for those preferences. It is a further object of the present invention to provide a debate and decision-making framework which allows participants to have more confidence in decision-making processes by structuring how arguments are presented and vetted, and by openly showing changes to context and neutral, supporting, and opposing arguments.

The present invention provides a framework for assisting individuals in decision making and managing decision making for groups and organizations. In one aspect, the present invention aggregates neutral and informational statements as well as supporting and opposing arguments relating to an assertion into an electronic archive accessible through a network, such that all submitted arguments may be reviewed by the public or appropriate members of the group or organization. In a preferred embodiment, one aspect of the present invention allows those reading an argument (assertion) to rate it for clarity. In a preferred embodiment, once an assertion has been sufficiently rated as clear, users may rate the assertion on an agreement/disagreement scale and on a scale of how relevant/irrelevant they perceive the assertion to be to an overarching topic or assertion, and users may add neutral, supporting or opposing arguments. Within this document, the terms "argument" and "assertion" are used interchangeably.

In a preferred embodiment, arguments are by default sorted to visually help participants prioritize and more accurately rate each argument relative to others. One aspect of the present invention allows participants to enter a reason for each rating they make, so they can be easily reminded of their thinking later, and so people can make their reasoning visible to others. In one embodiment, users may check a checkbox to keep their reasons private if they prefer, or may elect to make their reasoning visible to group decision makers but not visible to other participants. Since group decision makers benefit from knowing participants' reasoning, one aspect of the present invention allows for the requirement that participants include the reason (which will be visible to group decision makers) for their chosen ratings for each argument.

After participants have rated an assertion using the present invention, a project manager or group decision maker can see the relative preferences of participants as a whole and individually, but most importantly, can also understand why participants chose the ratings values they did. By collecting information from all participants, decision makers can learn whether particular participants have information that may not be commonly known to the rest of the group. Decision makers can also learn which participants may have misinformation. Such knowledge facilitates better management of the decision-making process, and enables better decisions.

In a preferred embodiment, each user is assigned one of seven global levels of authority, and different levels of authority grant access to different features. Features available to a user at a given authority level include enabling or disabling different ratings features and sub-argument creation features for those of lesser authority, and limiting access to content for those of lesser authority. In a preferred embodiment, the authority structure of the present invention is a tree structure. This facilitates for example a manager at a given level having authority over system features available to his or her direct reports, but not having such authority over features available to the direct reports of another manager at the same given level.

In a preferred embodiment, users at a given level of authority over a specific topic may assign that level of authority over that topic to someone who has a lesser level of authority over that topic. Such assigned authority is conditional on the continued approval of the person who assigned it, and the person who assigned it may remove that assigned level of authority at any time, even if that assigned level of authority is equivalent to their own level of authority. A preferred embodiment also allows someone at a given level of authority to make a topic or arguments pertaining to that topic (or reasons for arguments) visible or invisible to others of lesser authority, for instance based on "need to know". In a preferred embodiment, users may log into the system using another credentialing system to identify themselves (for instance Microsoft Active Directory, Google account, or Facebook account).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 depicts the graphical user interface of a preferred embodiment of the present invention in "Full Argument" display mode—displaying an assertion and sub-assertions (both pro and con) with supporting text and ratings for each.

FIG. 2 depicts the graphical user interface of a preferred embodiment of the present invention displaying a reason for a specific rating while being able to see other supporting and opposing arguments and their ratings simultaneously.

FIG. 8 depicts aspects of the present invention which enable a manager to set requirements and limitations regarding how subordinates may interact with the present invention, including argument rating and argument visibility.

FIG. 9 depicts an aspect of the present invention which enables users with sufficient authority to review the history of when edits were made to arguments, wherein the history includes changes made to the title and/or description of an assertion and/or what parent assertion that assertion is subordinate to.

FIG. 10 depicts an aspect of the present invention enabling users with sufficient authority to review and compare different past versions of an argument, and read comments on changes that were made over time.

FIG. 11 depicts an aspect of the present invention which enables users of sufficient authority to review the history of when edits were made to arguments, wherein the history includes a listing of which sub-assertions historically supported and/or opposed an overarching assertion of sub-assertion.

FIG. 12 depicts an aspect of the present invention which enables users of sufficient authority to review the history of changes in individual ratings and reasons for ratings over time.

FIG. 13 depicts an aspect of the present invention enabling a user at a given level of authority to set a rating scale and a description for the levels on the scale for an assertion and its sub-assertions.

FIG. 18 depicts an aspect of a preferred embodiment of the present invention enabling a user to enter two ratings for a chosen argument, and reasons for those ratings, and how those two ratings are combined through a mathematical formula to provide a single rating.

FIG. 19 depicts the graphical user interface of a preferred embodiment of the present invention in "Summary" display mode—displaying only assertion and sub-assertions (both pro and con) with ratings for each but without assertion descriptions.

DETAILED DESCRIPTIONS OF SOME PREFERRED EMBODIMENTS

Figure 17:
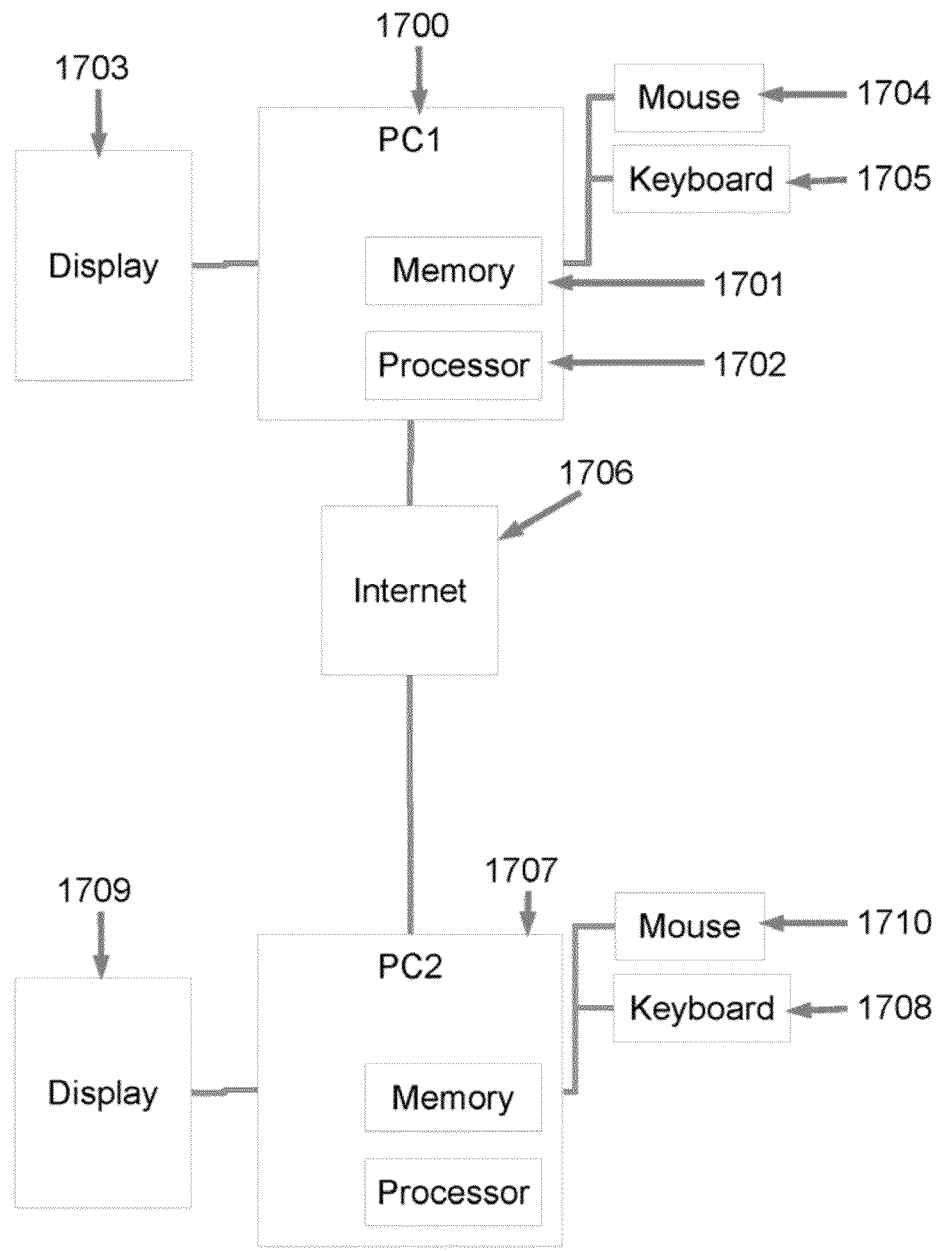
FIG. 17 is a block diagram of the hardware of a preferred embodiment of the present invention.

The hardware of a preferred embodiment of the present invention is depicted in FIG. 17. A computer 1700 reads and executes instructions from a computer-readable media 1701 (such as a hard disk, random access memory (RAM), read-only memory (ROM), CD-ROM, FLASH memory, or the like). The instructions are executed on processor 1702. A user of the present invention may control aspects of the invention using keyboard 1705 and/or pointing device 1704, in conjunction with display screen 1703.

In a web-hosted preferred embodiment, host computer 1700 is connected to a network (such as the Internet 1706), and a remote computer 1707 with remote display 1709, remote keyboard 1708, and remote pointing device 1710 may be used to access the features of the present invention. Remote computer 1707 may be a smart phone, tablet, laptop PC, desktop PC, or any other computing device as may become available, and pointing device 1710 may be a mouse, track ball, touch screen, or any other pointing device as may become available.

Figure 14:
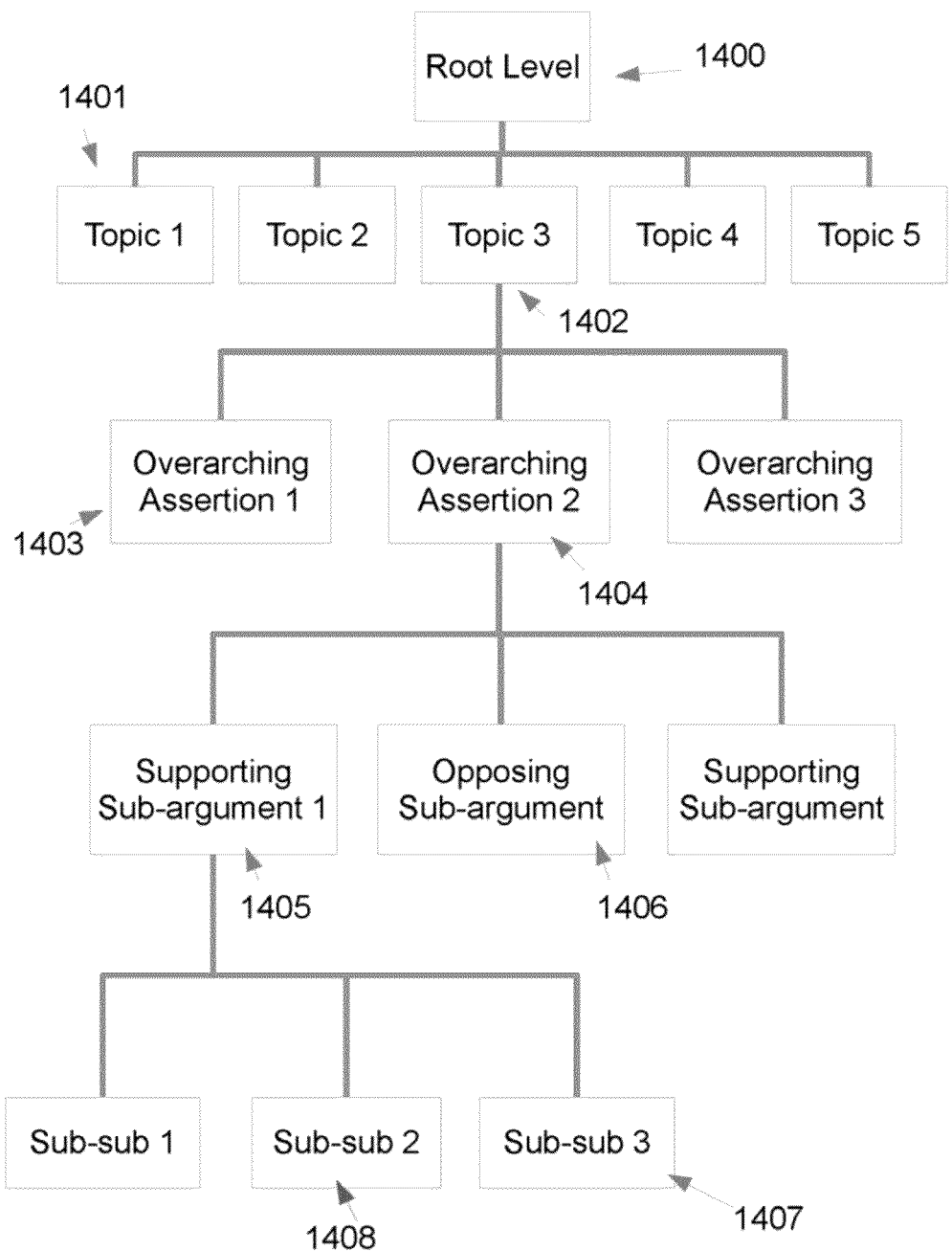
FIG. 14 depicts the tree structure of topics and arguments (assertions) according to one aspect of a preferred embodiment of the present invention.

Several aspects of the present invention take the form of a tree structure. FIG. 14 depicts the organization of arguments (also herein referred to as assertions) within a preferred embodiment of the present invention. The root 1400 of this tree may be considered to be the database which contains all the data. The next level of the tree in a preferred embodiment is a set of topics. For instance, topic 1402 might be "the environment", and topic 1401 might be "politics".

In a preferred embodiment, the next level of the argument tree is a set of overarching assertions. In this example, overarching assertions (arguments) 1403 and 1404 each concern the environment. For instance, overarching assertion 1404 may be an assertion about global warming, and overarching assertion 1403 may be about the environmental effects of mercury released into the atmosphere through the burning of coal.

The next level of this tree in a preferred embodiment of the present invention is a set of sub-arguments (sub-assertions) below each overarching assertion. A sub-assertion directly below any given assertion may herein be referred to as a child assertion of that given assertion. Likewise, a sub-assertion two levels below a given assertion may herein be referred to as a grandchild assertion of that given assertion. Likewise, an assertion which has a sub-assertion directly beneath it may herein be referred to as a parent assertion of the assertion which is directly beneath it, and an assertion one level above a parent assertion may herein be referred to as a grandparent assertion.

In a preferred embodiment, some of these sub-assertions may support the overarching assertion and some may oppose the overarching assertion. For instance, if overarching assertion 1404 is that global warming is predominantly man-made, sub-argument 1405 may be a supporting sub-argument that shows that average atmospheric temperatures have been rising as atmospheric carbon dioxide has been rising, and opposing sub-argument 1406 might be an assertion that glacial ice records show such rise and fall of global temperatures in the past before mankind existed. In a preferred embodiment, each sub-assertion such as sub-assertion 1405 may become its own overarching assertion, and have supporting and opposing sub-assertions (also herein referred to as "child" arguments) such as child arguments 1407 and 1408, that may support or oppose it.

Figure 15:
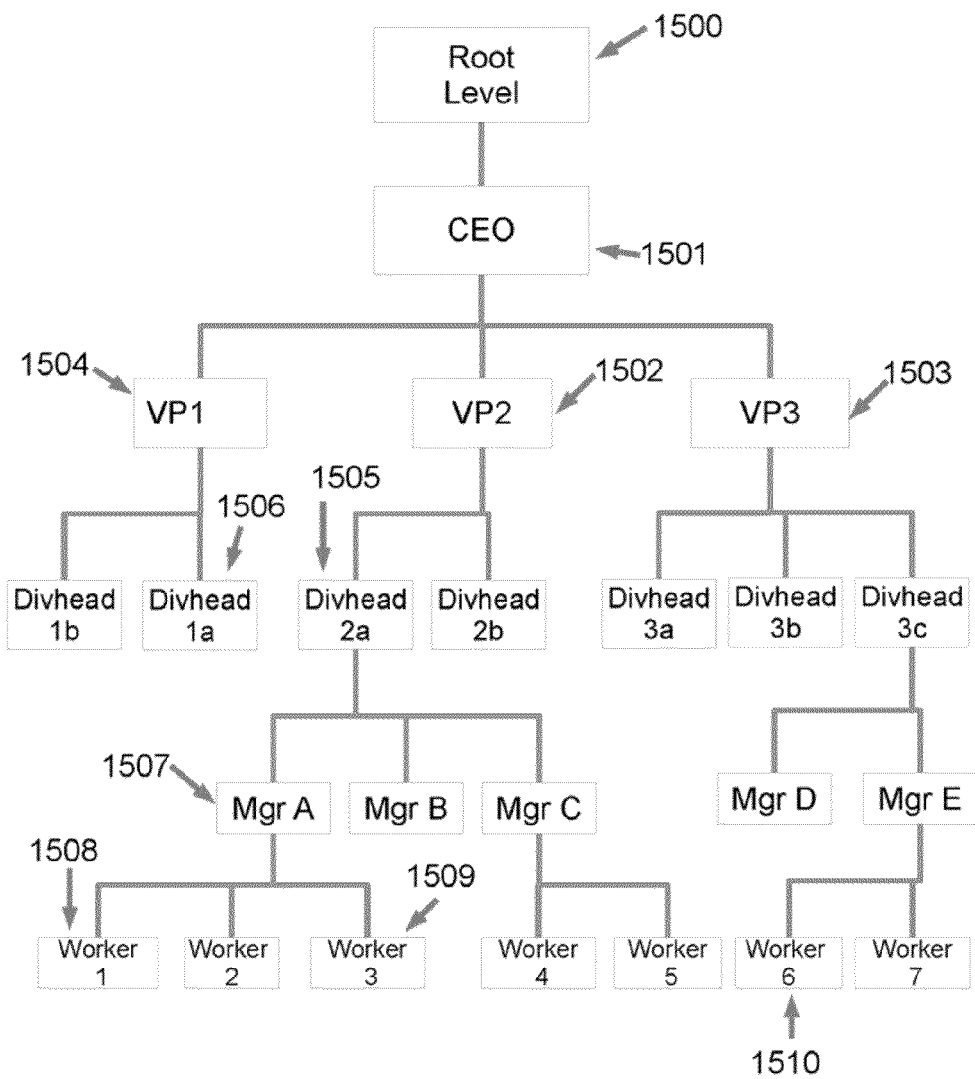
FIG. 15 depicts the tree structure of levels of authority within a preferred embodiment of the present invention.

In a preferred embodiment, levels of authority within the present invention are also organized in a tree structure. FIG. 15 depicts levels of authority in a preferred embodiment of the present invention. The root level of authority 1500 is originally held by the system administrator who configures the system, though in a preferred embodiment of the present invention the types of authority that such a person holds will be limited after the system is configured. Let us suppose that the present invention is used to facilitate decision making in a corporation, and the CEO holds the highest level of authority 1501 in that corporation. Vice presidents in the corporation hold levels of authority 1502, 1503, and 1504 that are parallel but distinct, in the sense that they each have people who report to them directly and indirectly over whom they have authority, but one VP does not have authority over another VP's direct and indirect subordinates.

Within this document, any first person to whom a second person does not report directly or indirectly, and who does not report to that second person directly or indirectly, is said to hold a parallel level of authority. Thus persons 1502, 1505, 1507, and 1508 all hold parallel levels of authority with respect to person 1503. In a preferred embodiment, when a user has authority over an assertion or topic within the present invention, he or she may revocably assign that level of authority over that topic or assertion to anyone of subordinate or parallel authority.

In a preferred embodiment, any person at a given level of authority in the authority tree of FIG. 15 may control whether various features of the present invention are available to persons who report either directly or indirectly to them. In a preferred embodiment, such persons have subordinate levels of authority. For example, VP2 who is at authority level 1502 may control what features of the present invention are available to persons at levels of authority 1505, 1507, 1508, and 1509 (unless overridden by the CEO who is at a higher authority level), but cannot control features of the present invention available to persons at levels of authority 1504, 1506, 1503, or 1510.

In a preferred embodiment, persons of parallel authority (for instance persons at authority levels 1502 and 1503) do not have authority over topics created by each other. In a preferred embodiment, when an overarching topic is created within the present invention by a person at authority level 1502, that person may confer a subordinate level of authority over that topic to a person of parallel authority (for instance the person at authority level 1503). Such a conferred subordinate authority level is topic-specific or assertion-specific. This aspect of the present invention enables peers to each have authority over topics and/or overarching assertions they create, and the arguments that are entered by others under those topics.

In a preferred embodiment, a person at (for example) authority level 1503 may set parameters regarding topics and overarching assertions he/she creates within the system (for instance a parameter requiring others to rate an overarching assertion for clarity prior to any sub-arguments being presented), and for persons of lesser authority such limitation is binding, while for persons of higher authority the limitation appears as a request that can be overridden.

In a preferred embodiment, anyone at a given level of authority may confer that level of authority to someone who is not his superior if he so desires, and may later revoke that authority. In a preferred embodiment, all aspects of a person's authority may be conferred, or only some aspects may be conferred. For instance, if a vice president at level of authority 1502 is charged with making global-warming-related recommendations to the CEO, and is utilizing the present invention within his division of the company to derive and vet a global warming policy, but will be in the hospital for the next two weeks undergoing heart surgery, he might choose to confer his authority over only that one topic to the person at authority level 1504, while he might choose to confer authority over another topic within the present invention to his subordinate at level of authority 1505.

Figure 6:
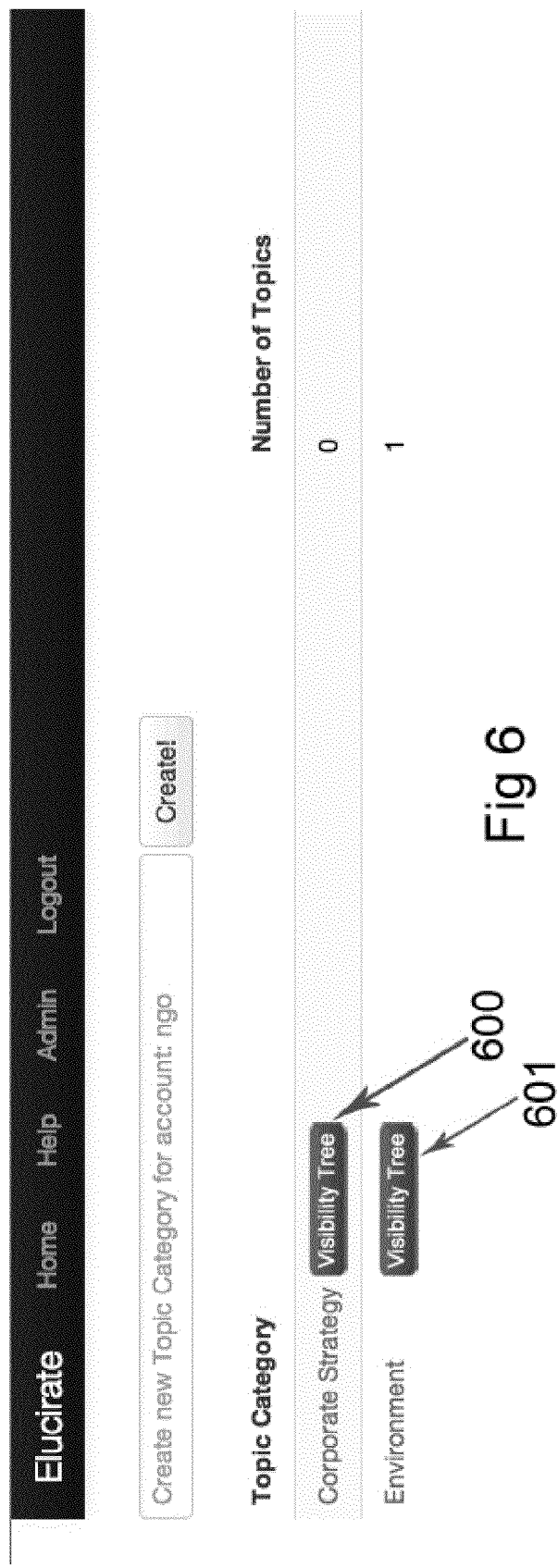
FIG. 6 depicts the graphical user interface of a preferred embodiment of the present invention, where a person with authority can see which topics are visible and which remain hidden.
Figure 16:
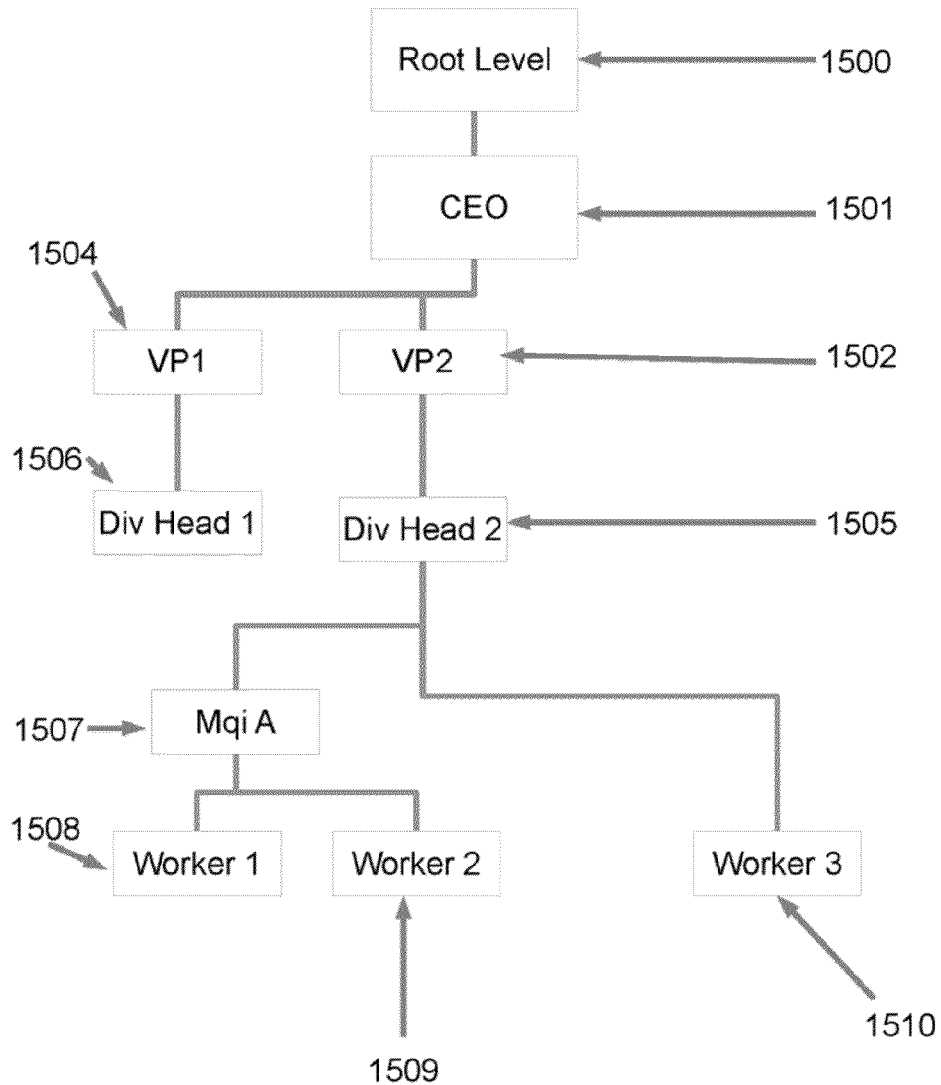
FIG. 16 depicts a "need to know" tree that might be set up by the CEO of a company utilizing a preferred embodiment of the present invention to aid in decision making in a project.

A preferred embodiment of the present invention allows someone at a given level of authority to make topics, overarching assertions, and any sub-arguments at levels below an overarching assertion visible or invisible to persons lower on the authority tree. This aspect of the present invention facilitates involving people in a project based on their "need to know". For instance, the CEO (at level of authority 1501) may conceive a strategic decision-making project in which he wants only eight other people in the corporation to participate. He may set up the "need to know" tree depicted in FIG. 16, where the only people able to see the topics and arguments related to the project are two vice presidents (at levels of authority 1502 and 1504), two division heads (at levels of authority 1505 and 1506), one first-level manager (at level of authority 1507), and three non-managers (at levels of authority 1508, 1509, and 1510. FIG. 6 depicts topics and illustrates how a person with sufficient authority can set and change visibility permissions by clicking on button 600 or 601.

Figure 1:
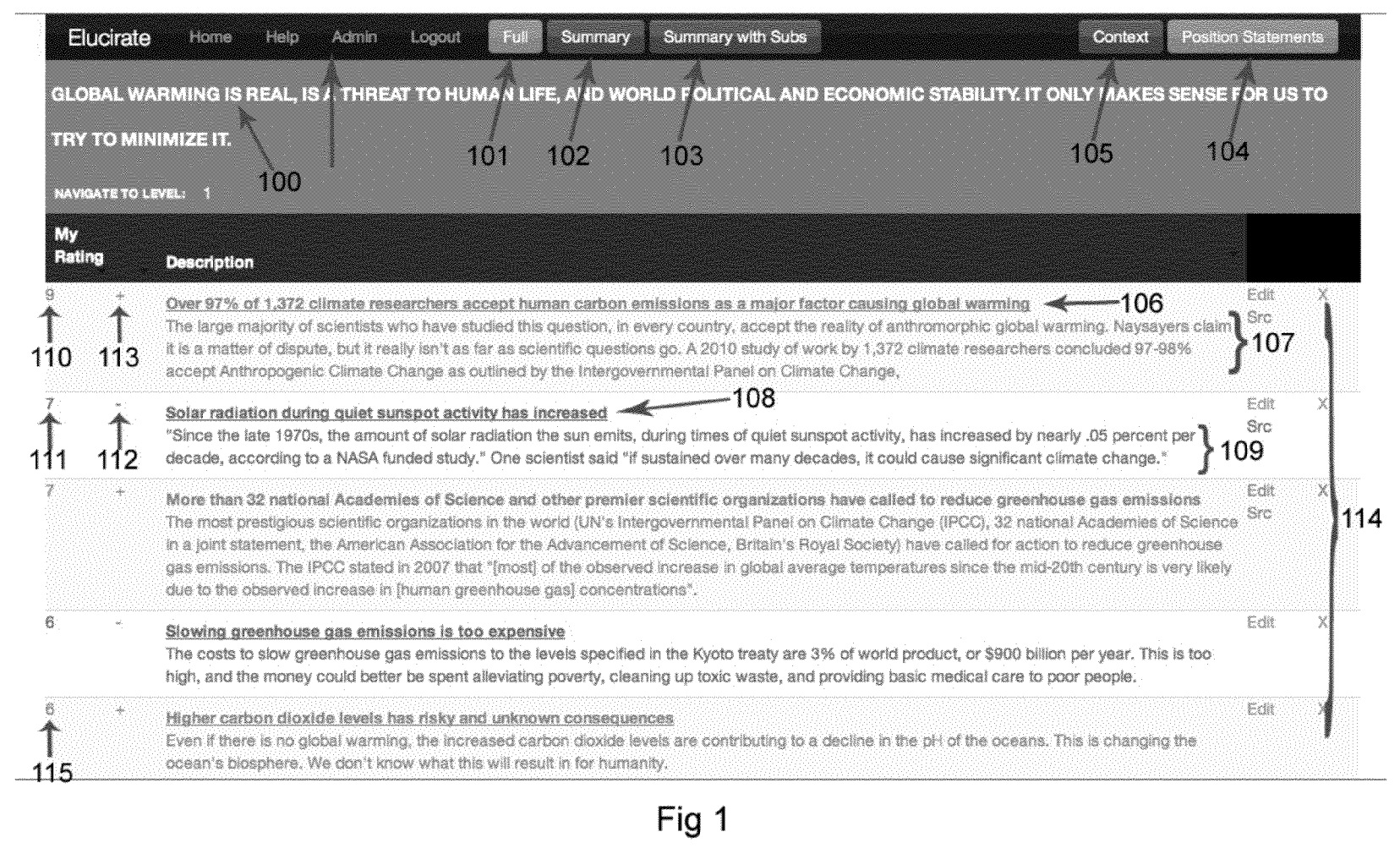

Now that we have described the levels of authority within a preferred embodiment of the present invention, we will describe how the argument-vetting features of a preferred embodiment of the present invention are used. FIG. 1 is a screen shot depicting an aspect of the present invention which aids in vetting arguments. Overarching assertion 100 is displayed in a banner across the top of the page, and may correspond, for example, to overarching assertion 1404 within topic 1402 in FIG. 14.

Sub-assertions 106, 108, etc. are shown below overarching assertion 100 in order of user-rated relevance. The user assigns agreement ratings 110, 111, etc. after reading sub-assertions 106, 108, etc. (and perhaps explanations/detailed descriptions 107, 109). In the embodiment shown, a higher agreement number indicates "more agreement", and a lower agreement rating indicates "less agreement". In a preferred embodiment, when list 114 of sub-arguments cannot be displayed on one screen, list 114 automatically becomes a scrolling list, and a vertical scrolling bar appears to the right of list 114. In a preferred embodiment, list 114 takes up at least 50% of the width of the display on which the interface of FIG. 1 is displayed.

In a preferred embodiment, assertions are displayed sorted such that first appear assertions that have not yet been rated, and next appear rated assertions in descending order from highest rated to lowest rated. This naturally leads a user to first rate all assertions, and subsequently by default to first have visible the assertions that were felt to be the most useful in evaluating an overarching assertion or sub-assertion.

Figure 20:
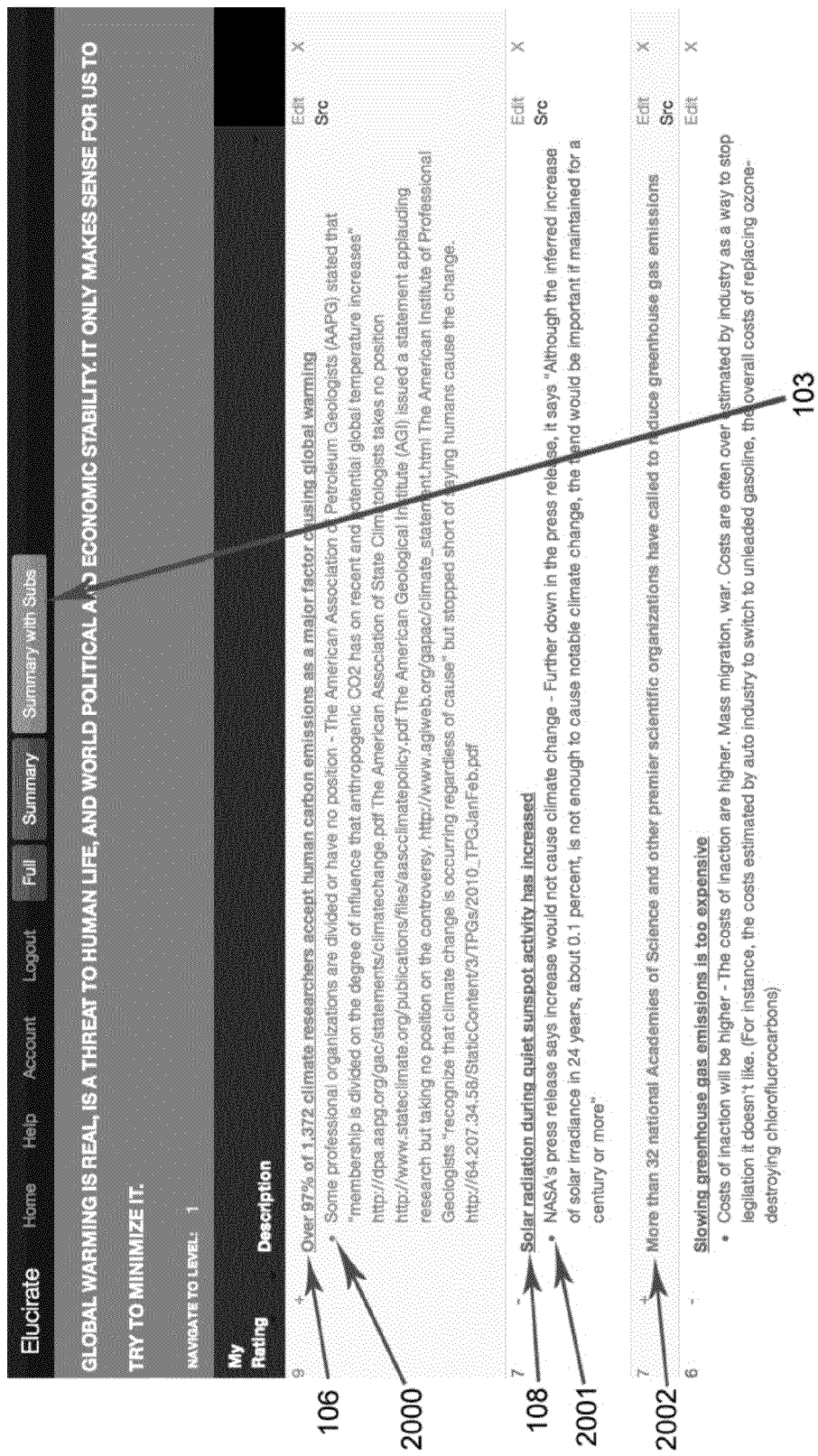
FIG. 20 depicts the graphical user interface of a preferred embodiment of the present invention in "Summary with Subs" display mode—displaying an assertion and sub-assertions (both pro and con) with ratings for each sub-assertion while also showing children of the displayed sub-assertions.

Button 101 selects the "Full" display mode shown in FIG. 1, where both sub-assertions 106, 108, etc., and descriptions 107, 109, etc. are displayed. Button 102 selects a display mode (shown in FIG. 19) where only sub-assertion summaries 106, 108, etc. are displayed. In a preferred embodiment, button 103 selects a display mode (which may be referred to as "Summary With Subs" mode, depicted in FIG. 20) where sub-assertion summaries 106, 108, etc., and summaries of sub-sub assertions 2000, 2001 below those assertions are also displayed.

Mode button 104 selects the display mode shown in FIG. 1 where assertions and sub-assertions are shown. Mode button 105 selects a display mode where context is displayed, including assertions that are similar but not part of the supporting or opposing assertions, assumptions and questions, implied narrative to the assertion, and big picture or background information.

Figure 7:
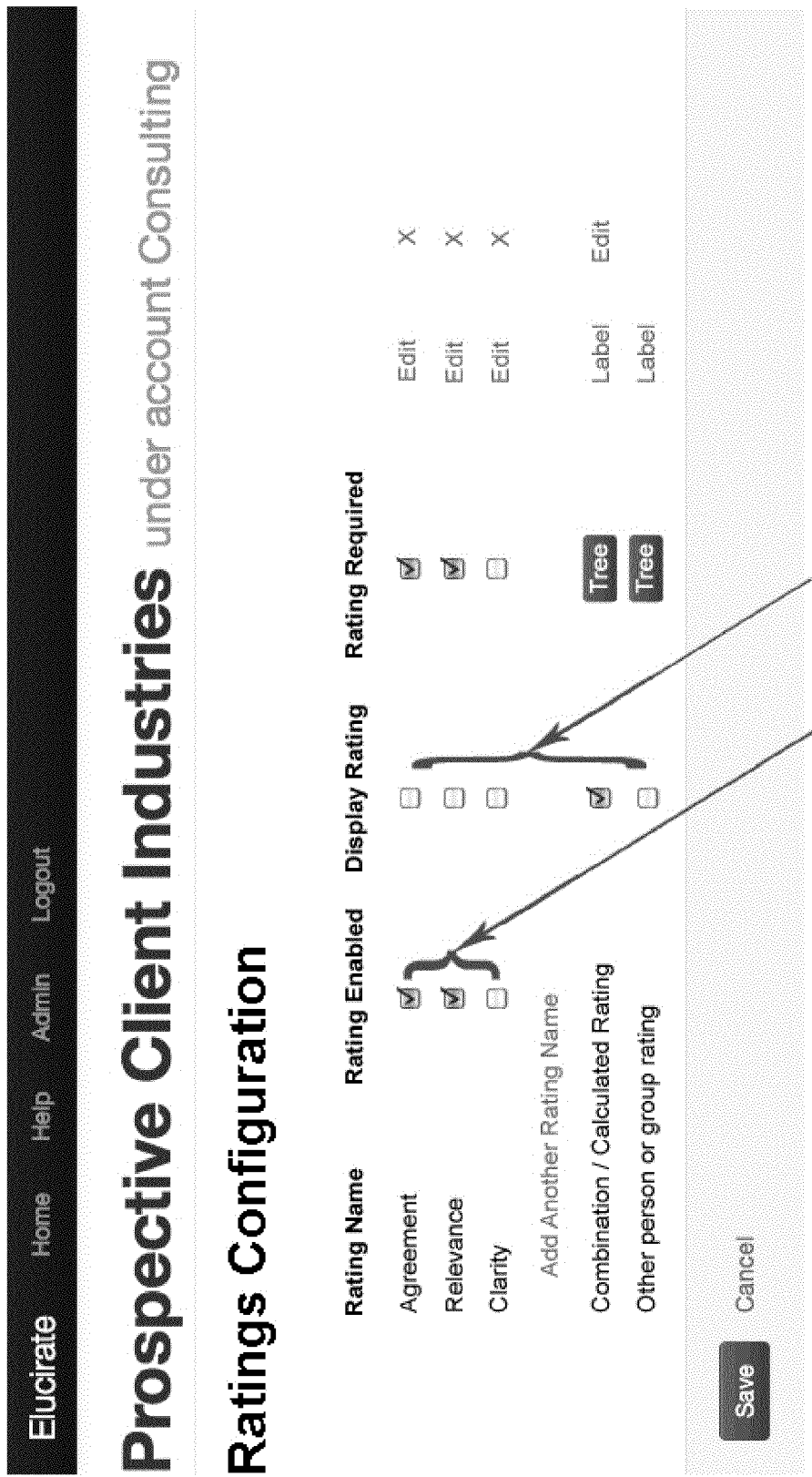
FIG. 7 depicts an aspect of the graphical user interface of a preferred embodiment of the present invention, where someone with appropriate authority can choose how to configure categories of ratings.

In a preferred embodiment, more than one column of user-assigned ratings (such as ratings column 115) may be visible in the user interface depicted in FIG. 1. For instance. In a preferred embodiment, the different ratings columns that can be shown in the interface of FIG. 1 include: relevance/irrelevance, agreement/disagreement, and clarity/unclarity. In a preferred embodiment, an aspect of which is depicted in FIG. 7, a user of sufficient authority may enable, or disable or require each type of rating separately for all persons or individual persons of lesser authority by selecting from options 700. A user of sufficient authority may determine what is displayed to the left of the sub-assertions, such as in 110 or 111, by selecting from 701 which rating(s) or calculations of ratings are to be displayed.

Requiring ratings of different types at different times may serve different purposes. When an overarching assertion is first posted, for instance, it may be desirable to make sure the assertion appears clear and unambiguous to everyone who will be involved in a decision-making process concerning that assertion, before debate about the assertion begins, so it may be desirable for a person of sufficient authority to require that everyone rate the clarity of the assertion (for instance on a scale from 1 (not clear at all) to 10 (perfectly unambiguously clear)), before any agreement/disagreement ratings or supporting or opposing arguments may be posted. For instance, if a manager posted the overarching assertion "customers who have bought product X extremely often on Tuesday afternoons call our call center with complaints", a user might rate that assertion very unclear, because someone who 70% agrees might be agreeing totally with the "extremely often", disagreeing with the "Tuesday afternoons", and partly agreeing with the "with complaints". It might also be pointed out that it is unclear whether the "extremely often" refers to how often the customer has bought the product or whether it refers to how often the customer calls.

FIG. 8 depicts an aspect of a preferred embodiment enabling a user with sufficient authority, once an assertion has been rated by a sufficient number of participants as sufficiently clear, to open an assertion for users to post one or more supporting and/or opposing sub-assertions before anyone is allowed to rate the overarching assertion on a scale of agreement/disagreement. FIG. 13 depicts an aspect of a preferred embodiment which enables a user of sufficient authority to define the number of ratings and their descriptors to users.

Figure 4:
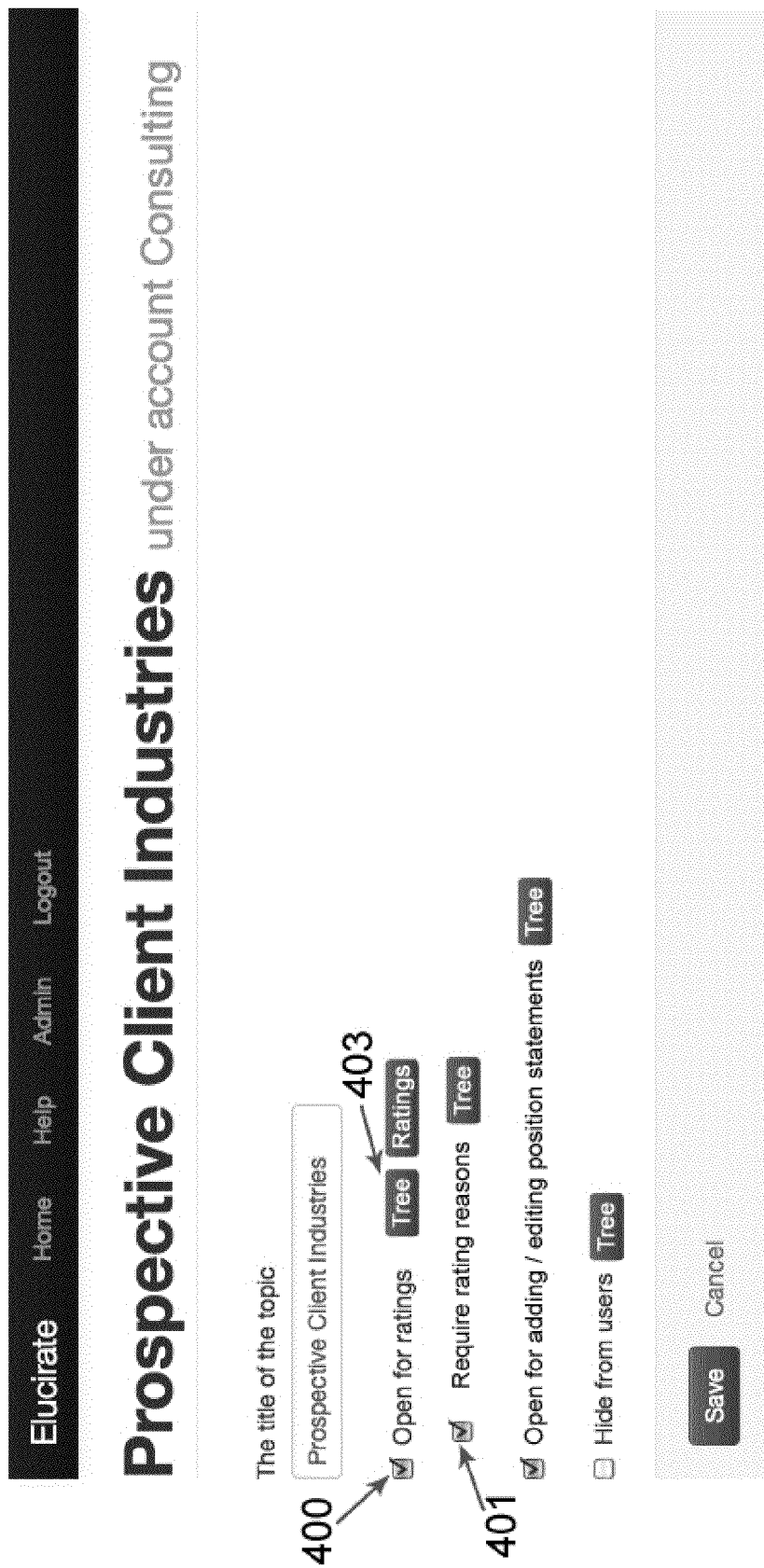
FIG. 4 depicts the graphical user interface of a preferred embodiment of the present invention where someone with appropriate authority can turn on and off the ability for other users to rate arguments, and to require users to include the reasoning for their rating. Rating can typically be disabled while arguments are being developed and then becomes open for ratings.

In a preferred embodiment, a user of sufficient authority may open an interface similar to that shown in FIG. 4 to enable agreement/disagreement ratings and require a reason to be typed for each rating entered. In a preferred embodiment, any attribute (such as "open for ratings" attribute 400 or "require rating reasons" attribute 401) can be set automatically for the entire tree of users of subordinate or parallel authority, or an associated "tree" button (such as tree button 403 associated with "open for ratings" parameter 400 can be clicked by the user to open up the portion of the authority tree of FIG. 15 that is below the authority of the user setting the parameter, and the user may set the parameter down to the level of individual users if desired.

FIG. 2 depicts the interface of FIG. 1 with an added overlaid sub-window text box 200 that appears when the user hovers his or her graphical pointer over rating argument rating 201. A graphical pointer in a preferred embodiment of the present invention may be controlled by a mouse, a track ball, a tablet pen, a touch-screen, or any other pointing device as may become available. In a preferred embodiment, rating 201 is a clickable link allowing a user to change his or her rating, and also includes the ability to edit a typed reason for such rating. The overlaid sub-window text box displays a text summary of why the user assigned the numerical rating he or she assigned. In a preferred embodiment, the rating number and the reason for the rating may both be edited within text 300 by the user.

FIG. 9 depicts an aspect of the present invention which enables users with sufficient authority to review the history of when edits were made to an argument's summary and description, as well as which assertion it supported or opposed.

FIG. 10 depicts an aspect of the present invention enabling users with sufficient authority to review and compare different past versions of an argument, and read comments on changes that were made over time.

FIG. 11 depicts an aspect of the present invention which enables users of sufficient authority to review the history of edits made to arguments, wherein the history includes a listing of which sub-assertions historically supported and opposed an overarching assertion or sub-assertion. Sub-assertions that have been changed are indicated by a triangle such as 1103. Record 1100 indicates that an opposing (indicated by red letters and a minus sign preceding it) sub-assertion was reworded from 'Not a US concern.' to 'Iran having nuclear weapons is not a US concern.' The red highlighting and strikethrough shows the letter 'N' that was removed and the green background and underlining shows how 'Iran having nuclear weapons is n' was added. Similarly, record 1101 indicates the whole supporting (indicated by green letters and by a + sign) sub-assertion 'Iranian bomb would upset regional power balance.' was added because it has the green background and underlined. Record 1102 indicates the last sub-assertion was removed because it has a red background and strikethrough.

Figure 3:
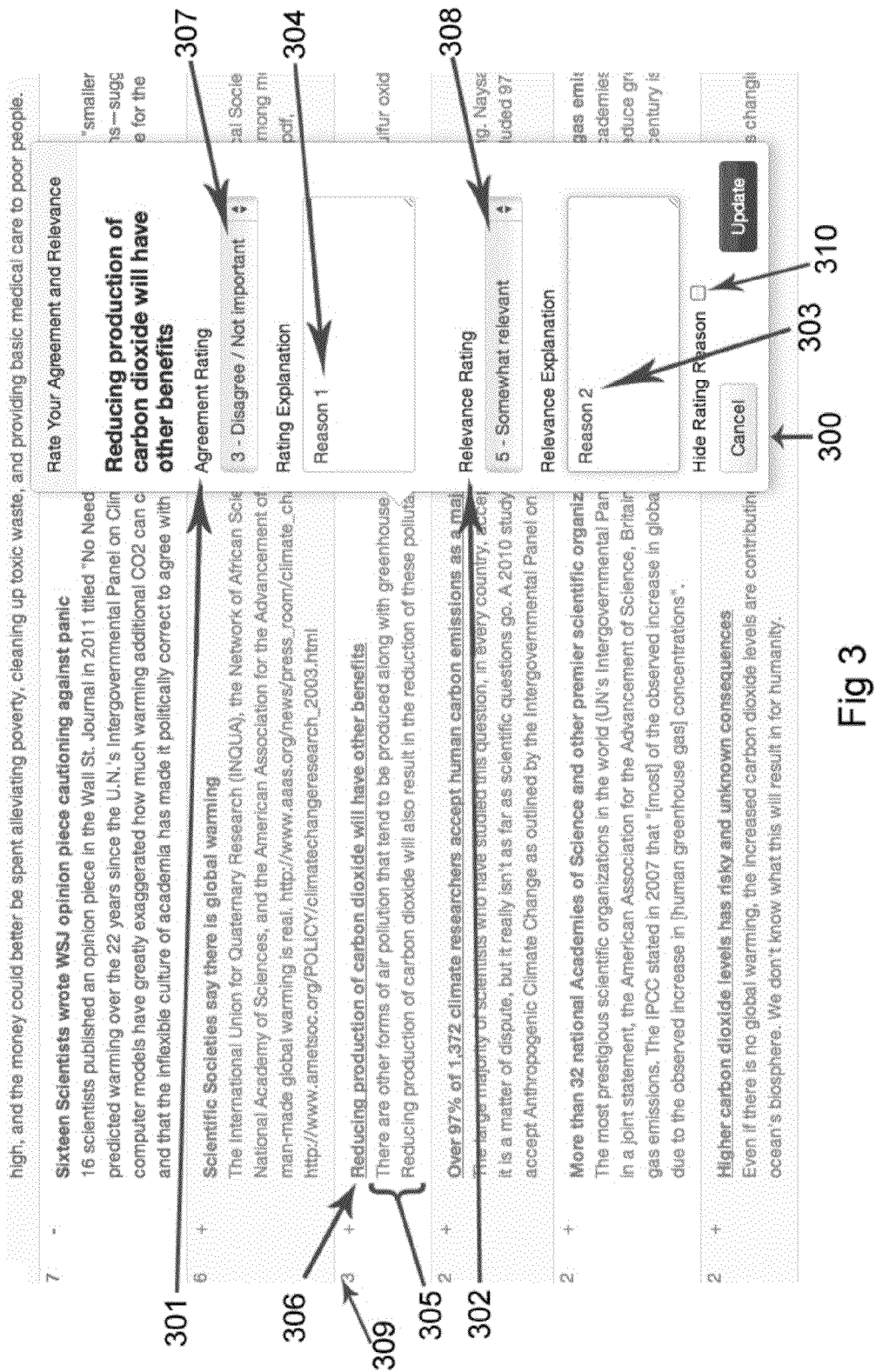
FIG. 3 depicts an aspect of a preferred embodiment of the present invention enabling a user to enter two ratings for a chosen argument, and reasons for those ratings.

FIG. 3 depicts an aspect of a preferred embodiment of the present invention enabling a user to enter two ratings for a chosen argument, and reasons for those ratings. In a preferred embodiment of the present invention, rating window 300 appears in response to the user clicking on rating 309. Within rating window 300, the user may select an agreement/disagreement rating number from a menu accessible through agreement rating menu button 307, and may select a relevance rating from relevance rating menu 308. The user may also type in a reason 304 for his or her chosen agreement rating, and a reason 303 for his or her chosen relevance rating. The user may also hide the reasons for the ratings from other users by checking checkbox 310.

Figure 5:
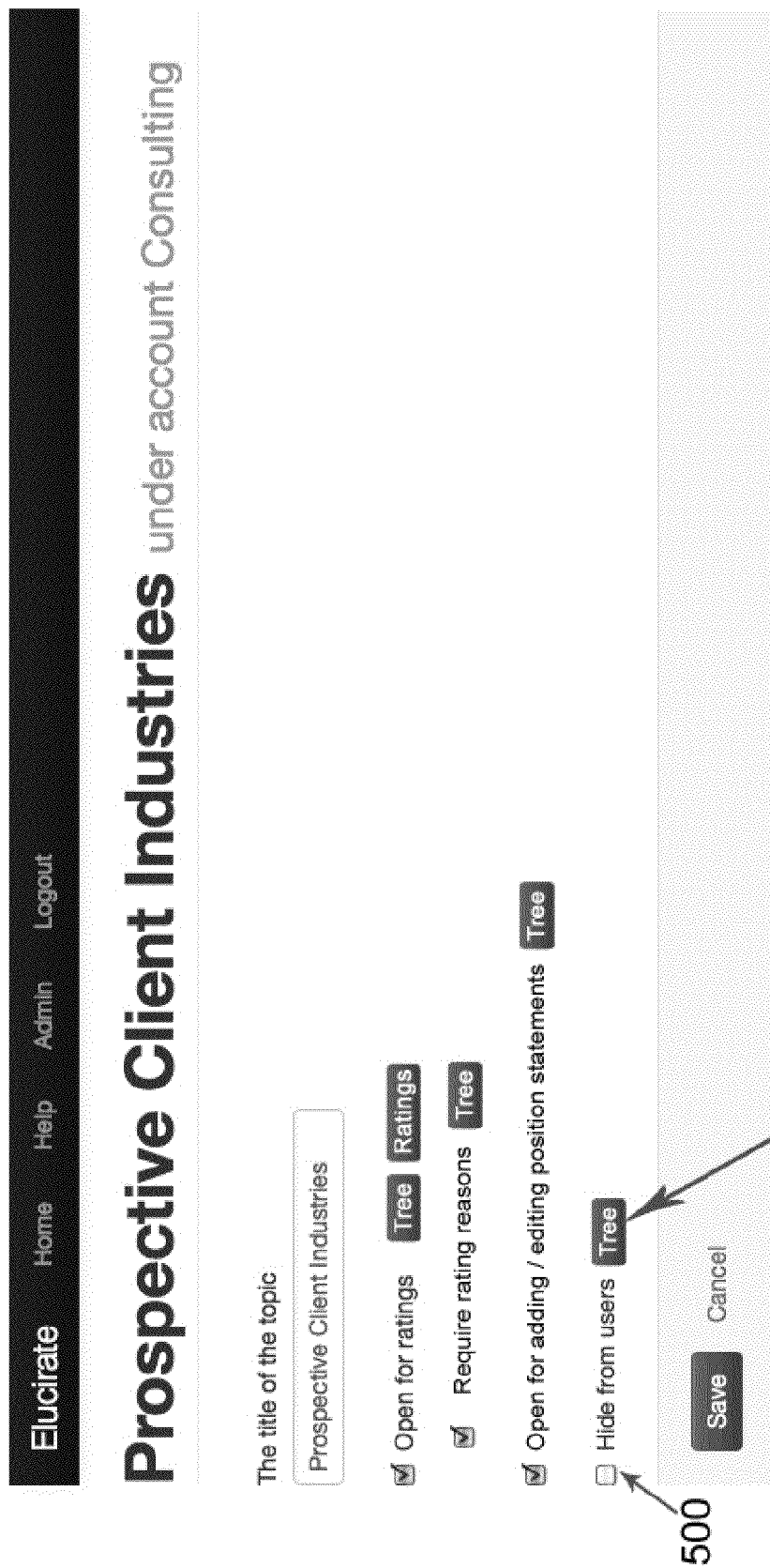
FIG. 5 depicts an aspect of the graphical user interface of a preferred embodiment of the present invention, where someone with appropriate authority can choose whether a topic is visible to users or hidden. Topics may be hidden while early in development.

FIG. 5 depicts an aspect of the graphical user interface of a preferred embodiment of the present invention, where someone with appropriate authority can choose whether a topic is visible to users or hidden. Topics may, for example, be hidden early in development. Check box 500 may be checked to make the topic invisible to all users of subordinate authority, or "need to know" tree button 501 may be clicked to open a window which allows the user to select which users of subordinate authority will be able to see the topic and which will not.

Figure 18:
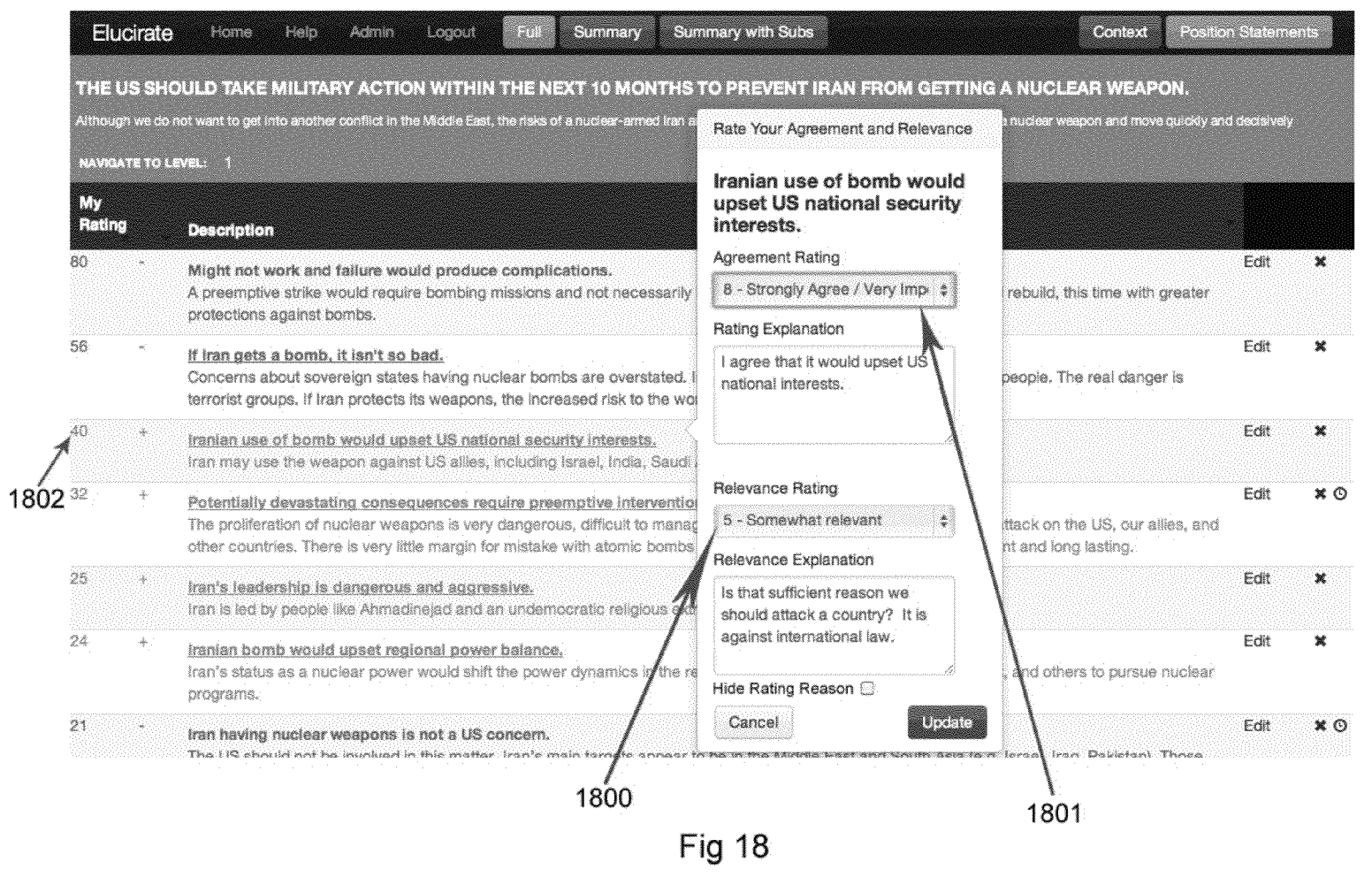

FIG. 18 depicts an aspect of a preferred embodiment of the present invention where two ratings, for example one for Agreement and the other for Relevance, are combined using a mathematical formula. In a preferred embodiment of the present invention, Agreement rating 1801 is multiplied by Relevance rating 1800 to generate the 'My Rating' 1802 associated with that sub-assertion.

Within this document, the term "hover-over event" describes a condition where a user has positioned a graphical pointer within a defined space for longer than some predetermined amount of time. Such an event may indicate curiosity about a graphical construct over which the user has hovered the graphical pointer. Such events are commonly detected in HTML2 web interfaces, and used to pop-up information boxes or dialog boxes.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

What is claimed is:

1. A system for editing and displaying a structured argument, having a plurality of associated parameters, the system comprising:
   a processor operative to execute computer executable instructions; and
   a computer readable medium that stores the computer executable instructions, the computer executable instructions comprising: instructions to display a user interface that displays the plurality of parameters at a user accessible display and receives input from a user defining the value of a selected parameter, wherein the plurality of parameters comprise an over-arching assertion and a plurality of sub-assertions with respective subjective user-defined ratings for said sub-assertions, and descriptions for said sub-assertions;
   a computational engine that alters the selected parameter to the defined value, updates the plurality of parameters according to the defined value of the selected parameter, and displays the altered parameters on the user interface, such that the display is updated in real time to reflect the user input; said user interface further comprising means for displaying on one screen at least one sub-assertion, ratings for all displayed sub-assertions, and descriptions for all displayed sub-assertions.

2. The system of claim 1, further comprising means for distinguishing levels of authority of users, and means for a user having sufficient level of authority to set a parameter requiring a user with lesser authority to provide a reason for each rating of a sub-assertion given by said user of lesser authority.

3. The system of claim 2, further comprising means allowing any given user to prevent other users from seeing his or her reasons for ratings given.

4. The system of claim 1, wherein said user-defined ratings parameters comprise first and second numerical ratings from an individual user regarding each sub-assertion rated by said user.

5. The system of claim 4 wherein said first numerical rating is a rating of agreement/disagreement, and said second numerical rating is a rating for relevance of said assertion to said overarching assertion.

6. The system of claim 5, wherein said user-defined ratings parameters further comprise a third numerical rating from said individual user regarding said sub-assertion, wherein said third numerical rating comprises a rating of clarity of said assertion.

7. The system of claim 6, further comprising means for distinguishing levels of authority of users, and means for a user having sufficient level of authority to set a parameter disabling users of lesser authority from rating anything other than clarity of an overarching assertion or sub-assertion.

8. The system of claim 1, wherein each of said respective user-defined ratings comprises a user-defined rating for clarity, a user-defined rating for agreement/disagreement, and a user-defined rating for relevance/irrelevance to said overarching assertion.

9. The system of claim 1, further comprising means for simultaneously displaying a reason for a rating, said means for displaying said reason for a rating comprising detecting a pointing device hover-over or click event, and means for displaying text in an overlaid sub-window in response to detection of said hover-over or click event.

10. The system of claim 1, further comprising means for distinguishing levels of authority of users, and means for a user of a given level of authority to disable ability of users of lesser levels of authority to enter one or more types of ratings data.

11. The system of claim 1, further comprising means for distinguishing levels of authority of users, and means for assigning user authority in a tree structure, wherein users of a given level of authority may assign or revoke their level of authority to a user of subordinate authority regarding a particular topic or overarching assertion.

12. The system of claim 11, further comprising means for a user at a given level of authority to set a "need-to-know" parameter for any user of subordinate authority regarding a particular assertion and its sub-assertions, said need-to-know parameter making said assertion and said sub-assertions visible or invisible to said user of subordinate authority.

13. The system of claim 1, further comprising means for distinguishing levels of authority of users, further comprising means for a user at a given level of authority to hide from users of subordinate authority an overarching assertion and its sub-assertions.

14. The system of claim 1, further comprising means for archiving and means for displaying the history of changes to parameters.

15. The system of claim 14, further comprising means for users to input reasons for any edits made, means for logging the identity of the user making the edit and the time and date of the edit, and means for displaying said reasons, identity, date, and time.

16. The system of claim 14, wherein said history includes a listing of which sub-assertions historically supported and opposed an overarching assertion or sub-assertion.

17. The system of claim 14, wherein said history includes a listing of which assertion said sub-assertion historically supported or opposed.

18. The system of claim 14, further comprising means for logging changes in individual ratings and reasons given for ratings over time.

19. The system of claim 1, further comprising means for a user at a sufficient level of authority to set a rating scale and a description for the levels on said scale for an assertion and its sub-assertions.

20. The system of claim 1, further comprising means for distinguishing levels of authority of users, and means for a user of a given level of authority to disable ability of users of subordinate levels of authority from editing sub-assertions or adding further sub-assertions.

21. The system of claim 1, wherein the ratings visible to a user reflect exclusively ratings made by that user.

22. The system of claim 21, where the ratings visible to a user are a mathematical function of a plurality of said user's ratings.

23. The system of claim 1 or 21 or 22, where the arguments are displayed sorted in descending order from highest rated to lowest rated.

24. The system of claim 1, where a first user of sufficient authority can choose what combination of the following types of ratings are visible to a second user of subordinate authority:
second user's personal ratings,
ratings mathematically derived from a group of users,
ratings mathematically derived from a plurality of said second user's ratings,
first user's personal ratings.

25. The system of claim 1, wherein said sub-assertions and their descriptions take up at least 50% of the horizontal screen space on said display.

26. The system of claim 1, further comprising means for toggling between a first mode and a second mode in response to a single-click or hover-over event, wherein said first mode comprises displaying each sub-assertion in summary mode, and said second mode comprises displaying each sub-assertion in full description mode, where each sub-assertion displayed includes both a summary and a more detailed description.

27. The system of claim 1, further comprising means for toggling between a first mode and a second mode in response to a single-click or hover-over event, wherein said first mode displays summaries for sub-sub-assertions along with sub-assertions and said second mode does not.

28. The system of claim 1, further comprising means for displaying a reason for each rating of each sub-assertion.

29. The system of claim 1, further comprising means for distinguishing levels of authority of users, and means for a user of a sufficient level of authority to edit a sub-assertion until that sub-assertion has at least one child assertion.

30. The system of claim 1, further comprising means for distinguishing levels of authority of users, and means for a user of a given sufficient authority to edit a given assertion until said given assertion has been rated.

31. The system of claim 1, further comprising means for distinguishing levels of authority of users, and means allowing a user having sufficient authority to set a parameter determining whether those with subordinate authority can display the identity of persons who create and/or edit assertions.

32. A system for editing and displaying a structured argument, having a plurality of associated parameters, the system comprising:
a processor operative to execute computer executable instructions; and
a computer readable medium that stores the computer executable instructions, the computer executable instructions comprising: instructions to display a user interface that displays the plurality of parameters at a user accessible display and receives input from a user defining the value of a selected parameter, wherein the plurality of parameters comprise an over-arching assertion and a plurality of sub-assertions with respective subjective user-defined ratings for said sub-assertions, and descriptions for said sub-assertions;
a computational engine that alters the selected parameter to the defined value, updates the plurality of parameters according to the defined value of the selected parameter, and displays the altered parameters on the user interface, such that the display is updated in real time to reflect the user input; said user interface further comprising means for displaying on one screen at least one sub-assertion, and ratings for all displayed sub-assertions, where each displayed sub-assertion has displayed at least one rating, including at least one user rating.

33. A system for editing and displaying a structured argument, having a plurality of associated parameters, the system comprising:
a processor operative to execute computer executable instructions; and
a computer readable medium that stores the computer executable instructions, the computer executable instructions comprising: instructions to display a user interface that displays the plurality of parameters at a user accessible display and receives input from a user defining the value of a selected parameter, wherein the plurality of parameters comprise an over-arching assertion and a plurality of sub-assertions with respective subjective user-defined ratings for said sub-assertions, and descriptions for said sub-assertions;
a computational engine that alters the selected parameter to the defined value, updates the plurality of parameters according to the defined value of the selected parameter, and displays the altered parameters on the user interface, such that the display is updated in real time to reflect the user input; said user interface further comprising means for displaying on one screen at least one sub-assertion, and ratings for all displayed sub-assertions, where the assertions are displayed sorted such that first appear assertions that have not yet been rated, and next appear rated assertions in descending order from highest rated to lowest rated.

* * * * *